(12) United States Patent
Yamada et al.

(10) Patent No.: US 7,257,185 B1
(45) Date of Patent: Aug. 14, 2007

(54) FUEL ASSEMBLY AND THIMBLE SCREW OF THE SAME

(75) Inventors: Masahiko Yamada, Kobe (JP); Koichi Nunokawa, Kobe (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/673,248

(22) Filed: Sep. 30, 2003

Related U.S. Application Data

(62) Division of application No. 10/102,837, filed on Mar. 22, 2002, now Pat. No. 6,674,831.

(30) Foreign Application Priority Data

| | | | |
|---|---|---|---|
| Apr. 5, 2001 | (JP) | | 2001-107148 |
| Apr. 26, 2001 | (JP) | | 2001-129035 |
| Jan. 22, 2002 | (JP) | | 2002-013333 |

(51) Int. Cl.
*G21C 3/32* (2006.01)

(52) U.S. Cl. ...................... 376/449; 376/207; 376/434; 376/225

(58) Field of Classification Search ................ 376/224, 376/225, 444, 449, 353, 364, 234, 352, 243, 376/434, 207
See application file for complete search history.

(56) References Cited

U.S. PATENT DOCUMENTS

| | | | | |
|---|---|---|---|---|
| 3,562,109 | A | | 2/1971 | Bezold et al. .............. 376/234 |
| 4,668,469 | A | * | 5/1987 | Widener ..................... 376/353 |
| 4,826,648 | A | | 5/1989 | Savery ........................ 376/225 |
| 4,828,791 | A | * | 5/1989 | DeMario ..................... 376/352 |
| 4,996,021 | A | * | 2/1991 | Bryan ......................... 376/353 |
| 5,068,083 | A | | 11/1991 | John, Jr. et al. ............ 376/449 |

(Continued)

FOREIGN PATENT DOCUMENTS

EP     0 895 248     2/1999

(Continued)

OTHER PUBLICATIONS

Derwent Publications, XP-002199113, JP 61-217795, Sep. 27, 1986.

(Continued)

*Primary Examiner*—Ella Colbert
*Assistant Examiner*—Daniel Lawson Greene, Jr.
(74) *Attorney, Agent, or Firm*—Oblon, Spivak, McClelland, Maier & Neustadt, P.C.

(57) ABSTRACT

A fuel assembly includes a bottom nozzle set on a lower core plate of a nuclear reactor, a top nozzle with a hold down spring to urge the bottom nozzle against the lower core plate, guide thimbles which guide control rods, having passed through the top nozzle, toward the lower core plate, a dashpot formed on each of the guide thimbles to reduce the fall velocity of a corresponding one of the control rods, a thimble screw which connects each of the guide thimbles to the bottom nozzle, and a drain hole formed to extend through each of the thimble screw. The dashpot has a large-diameter portion with substantially the same diameter as that of each of the guide thimbles. The diameter d of the drain hole falls within a range of 0.04 D<d<0.08 D where D is an inner diameter of the large-diameter portion.

4 Claims, 6 Drawing Sheets

U.S. PATENT DOCUMENTS

| | | | |
|---|---|---|---|
| 5,100,608 A | | 3/1992 | Konomura et al. .......... 376/171 |
| 5,232,655 A | * | 8/1993 | Verdier ....................... 376/353 |
| 5,606,583 A | * | 2/1997 | Verdier ....................... 376/234 |
| 5,663,993 A | * | 9/1997 | Danielson et al. .......... 376/444 |
| 5,852,644 A | * | 12/1998 | Brosset et al. .............. 376/353 |
| 6,226,343 B1 | * | 5/2001 | Frederickson et al. ...... 376/444 |
| 6,246,741 B1 | | 6/2001 | Nunokawa et al. ......... 376/434 |

FOREIGN PATENT DOCUMENTS

| | | |
|---|---|---|
| EP | 0 971 364 | 1/2000 |
| JP | 2002-40182 | 2/2002 |

OTHER PUBLICATIONS

Derwent Publications, XP-002199114, JP 61-217796, Sep. 27, 1986.

Patent Abstracts of Japan, JP 08-189981, Jul. 23, 1996.

Patent Abstracts of Japan, JP 02-055994, Feb. 26, 1990.

Patent Abstracts of Japan, JP 10-123274, May 15, 1998.

* cited by examiner

FUEL ASSEMBLY AND THIMBLE SCREW OF THE SAME

CROSS-REFERENCE TO RELATED APPLICATIONS

This application is based upon and claims the benefit of priority from the prior Japanese Patent Applications No. 2001-107148, filed Apr. 5, 2001, No. 2001-129035, filed Apr. 26, 2001; and No. 2002-013333, filed Jan. 22, 2002, the entire contents of all of which are incorporated herein by reference.

BACKGROUND OF THE INVENTION

1. Field of the Invention

The present invention relates to a fuel assembly used in a nuclear reactor, and a thimble screw of the fuel assembly.

2. Description of the Related Art

An example of a nuclear reactor currently widely used for power generation includes a pressurized water reactor (to be referred to as "PWR" hereinafter). A fuel assembly used by the PWR is generally a canless fuel assembly with no wrapper tube. The structure of the canless fuel assembly will be briefly described. Top and bottom nozzles each having a plurality of coolant flow holes are connected to each other with a plurality of control rod guide tubes extending parallel to each other.

More specifically, the upper ends of the control rod guide tubes, i.e., so-called guide thimbles, are mechanically connected to the top nozzle, and the lower ends thereof are also mechanically connected to the bottom nozzle. These guide thimbles respectively accept the thin elongated control rods of a control rod cluster. Depending on the loading position of the fuel assembly in the core, the guide thimbles do not accept the control rods as they are not located at corresponding positions. In this case, the guide thimbles accept non fuel bearing components (NFBC) such as thimble plugs or burnable poisons. A plurality of grids are mounted on the guide thimbles. The fuel rods are accepted in the lattice openings and are elastically supported there.

Of the structure of the fuel assembly briefly described above, the structure of the connecting portion that connects the guide thimbles and bottom nozzle will be described in more detail with reference to the accompanying drawings.

FIG. 1 is an elevation schematically showing the structure of a fuel assembly applied to a PWR.

FIG. 2A is a sectional elevation showing part of the lower structure of this fuel assembly, and FIG. 2B is a bottom view of the same.

As shown in FIG. 1, a fuel assembly 1 has top and bottom nozzles 3 and 4 at upper and lower ends of elongated guide thimbles 2, and a top grid 5, middle grids 6, and bottom grid 7 fixed to the guide thimbles 2 in the longitudinal direction. Each of the top and bottom grids 5 and 7 is formed from a large number of lattice frames using thin plates, and holds fuel rods 8.

The top nozzle 3 is a bottomed box-like structure with a substantially square horizontal section. The top nozzle 3 has a plurality of coolant flow holes and guide thimble mounting holes in its end plate corresponding to the bottom plate. In addition, a hold down spring 9 is attached to the upper portion of the top nozzle 3. The bottom nozzle 4 has a top or end plate with a substantially square shape when seen from above, where a plurality of coolant flow holes and guide thimble mounting holes are formed. Legs 10 are respectively integrally formed to project from the four corners of the lower surface of the end plate.

The top and bottom nozzles 3 and 4 are connected to the upper and lower ends of the plurality of hollow tube-like guide thimbles 2 by utilizing the mounting holes described above.

Referring to FIGS. 2A and 2B, the lower end of each hollow tube-like guide thimble 2 is welded to a thimble end plug 12, and is fixed to the bottom nozzle 4 with a thimble screw 14 through an insert 13. One top grid 5 and seven middle grids 6 are mounted on the guide thimbles 2 at intervals, and the bottom grid 7 is mounted on the guide thimbles 2 through its connecting structure. It should be understood that the number of middle grids 6 can be appropriately changed.

The bottom grid 7 is fixed to the upper portion of the insert 13. A drain hole 15 extends through the thimble screw 14 in the axial direction, and a rotation preventive pin 17 for preventing loosening of the thimble screw 14 is provided to a seat 16 of the drain hole 15. The drain hole 15 allows the coolant in use to flow in the core in a direction P shown in FIG. 2A.

Furthermore, the seat 16 has a spot facing hole 18 communicating with the lower portion of the drain hole 15 and reaching the bottom surface of the seat 16. The rotation preventive pin 17 does not interfere with the flow of the coolant flowing into the drain hole 15 in the direction P.

The fuel rods 8 are inserted in and supported by the aligned lattice openings of the upper, middle, and bottom grids 5, 6, and 7 one by one, thus forming the fuel assembly 1.

With this structure, the drain holes 15 of the thimble screws 14 guide the coolant into the guide thimbles 2 in the core, and the introduced coolant cools the non fuel bearing components mounted in the guide thimbles 2. The drain holes 15 also serve as holes for sending the inner coolant to the outside.

During a scram mode of the nuclear reactor, the control rods are urgently inserted in the guide thimbles 2 by free fall. The drain holes 15 also serve as a restrictor for limiting the outflow velocity of the inner coolant so the fall impact is moderated. In other words, to assure the cooling function described above, the larger the diameter d of the drain hole 15 of the thimble screw 14, the better. To moderate the fall impact produced when the control rods fall, the smaller the diameter d, the better, which is contradictory.

During the scram mode of the nuclear reactor, when the control rods are urgently inserted in the guide thimbles 2 by free fall, an excessively large impact occurs to the top nozzle 3. For this reason, the guide thimbles 2 respectively have thin tube-like dashpots 20. The dashpots 20 reduce the velocity of the control rods falling in the guide thimbles 2, thereby moderating the excessively large impact acting on the top nozzle 3.

According to an example of the fuel assembly 1 with such dashpots 20, as shown in FIG. 3, a dashpot 20 with a length of 0.16 L to 0.18 L is provided to the guide thimble 2 where L is the length of the guide thimble 2 along its axial direction. Therefore, the compression load acting on the guide thimble 2 in the axial direction may cause flexural deformation of the dashpot 20. In this case, the control rod may not be inserted well.

For this reason, as shown in FIGS. 4 and 5, a technique is disclosed in which the length of the dashpot 20 of the guide thimble 2 is decreased. With this arrangement, the length of the dashpot 20 with respect to the length L of the guide thimble 2 can be suppressed to fall within the range of 0.03 L to 0.1 L, so the flexural rigidity of the dashpot 20 is increased. This can prevent flexural deformation of the dashpot 20.

This guide thimble will be referred to as an improved guide thimble hereinafter. The lower structure of a fuel assembly 1 to which an improved guide thimble shown in FIG. 5 is applied is different from that of the fuel assembly 1 shown in FIG. 2A only in that sleeves 21 are provided at the bottom grids 7 and that it has a dashpot 20 only at one portion, and is substantially the same as that of the fuel assembly shown in FIG. 2A.

In the fuel assembly to which the improved guide thimble is applied, the length of the dashpot 20 on the lower end side of the guide thimbles 2 is decreased, as shown in FIGS. 4 and 5. This increases the flexural rigidity of the dashpot 20 to prevent its flexural deformation. However, a so-called braking effect that moderates the fall velocity of the control rod is decreased.

In a PWR, its fall terminal velocity is limited from the viewpoint of ensuring the safety of the fuel assembly 1. Originally, the dashpot 20 is provided to the guide thimble 2 in an axial direction, as shown in FIG. 3, in order to moderate the fall velocity of the control rod such that the fall terminal velocity does not exceed a limit. For this reason, in the fuel assembly 1 employing the improved guide thimble as shown in FIGS. 4 and 5, a countermeasure that moderates the fall terminal velocity of the control rod must be provided by another means.

BRIEF SUMMARY OF THE INVENTION

The present invention has been made in view of the above situation, and has as its object to provide a fuel assembly in which an improved guide thimble is employed and the diameter of the drain hole of a thimble screw is adjusted so that a fall impact produced when a control rod falls is moderated, and flexural deformation of a dashpot is prevented, without impairing the cooling function of non fuel bearing components, and a thimble screw of the fuel assembly.

In order to achieve the above object, the present invention has the following means.

According to a first aspect of the present invention, there is provided a fuel assembly comprising a bottom nozzle set on a lower core plate of a nuclear reactor, a top nozzle with a hold down spring to urge the bottom nozzle against the lower core plate, a plurality of control rod guide tubes which guide control rods, having passed through the top nozzle, toward the lower core plate, top, middle, and bottom grids mounted on the control rod guide tubes, a plurality of fuel rods held by the grids to be substantially parallel to the control rod guide tubes, a thin tube-like dashpot formed on each of the control rod guide tubes to reduce a fall velocity of a corresponding one of the control rods, a thimble screw which connects each of the control rod guide tubes to the bottom nozzle, and a drain hole formed to extend through the thimble screw. The dashpot has a large-diameter portion, at a lower portion thereof, with substantially the same diameter as that of each of the control rod guide tubes, and a diameter d of the drain hole falls within a range of 0.04 D<d<0.08 D where D is an inner diameter of the large-diameter portion.

Hence, the coolant can be sufficiently supplied also from the viewpoint of assuring the cooling function of the non fuel bearing components. From the viewpoint of moderating the fall impact of the control rod as well, the terminal velocity of the control rod can be suppressed to be equal to or less than the fall velocity with which the fall impact of the control rod can be moderated. Therefore, flexural deformation of the dashpot can be prevented.

A fuel assembly according to a second aspect of the present invention has the following thimble screw.

More specifically, the thimble screw is disposed in a bottom nozzle so as to extend from a bottom surface side, has a drain hole extending in the thimble screw in a longitudinal direction from a spot facing hole of a seat to a distal end, is formed such that a coolant is supplied into the drain hole from the spot facing hole toward the distal end while the nuclear reactor operates and into the drain hole from a distal end side toward the spot facing hole during a scram mode, is locked to the bottom nozzle at the seat with a rotation preventive pin, and is provided with a coolant collision portion, at a drain hole side of the rotation preventive pin, against which the coolant flowing from the distal end side toward the spot facing hole collides in order to increase the pressure drop of the coolant during the scram mode.

Furthermore, a collision surface of this coolant collision portion against which the coolant collides forms a recessed surface ground in a V-shape from the distal end side toward the spot facing hole, a flat surface, or a recessed surface arcuately ground from the distal end side toward the spot facing hole.

With the above arrangement, the thimble screw can also serve as a diode. Thus, while the non fuel bearing components have the same cooling ability as that of the conventional case, the decelerating effect of the control rod can be improved by the increase in fluid resistance.

A fuel assembly according to a third aspect of the present invention has the following thimble screw.

More specifically, the thimble screw is disposed in a bottom nozzle to extend from a bottom surface side, has first and second drain holes extending in the thimble screw in a longitudinal direction from a spot facing hole of a seat to a distal end, and is formed such that a coolant is supplied into the first and second drain holes from the spot facing hole toward a distal end side while the nuclear reactor operates and into the second and first drain holes from the distal end side toward the spot facing hole during a scram mode. The thimble screws is locked to the bottom nozzle at the seat with a rotation preventive pin. The first drain hole has an opening area smaller than an opening area of the spot facing hole and smaller than an opening area of the second drain hole at the distal end.

Furthermore, the thimble screw is provided with a coolant collision portion, at a first drain hole side of the rotation preventive pin, against which the coolant flowing from the distal end side toward the spot facing hole collides in order to increase the pressure drop of the coolant during the scram mode.

The collision surface of the coolant collision portion against which the coolant collides forms a recessed surface ground in a V-shape from the distal end side toward the spot facing hole, a flat surface, or a recessed surface arcuately ground from the distal end side toward the spot facing hole.

Since the thimble screw has the above arrangement, the coolant enters from the distal end side and is discharged in the form of a jet from the drain hole toward the rotation preventive pin. As the rotation preventive pin strongly functions as a fluid resistance, the pressure drop for the flow of the coolant in the scram mode can be increased, and the decelerating effect of the control rod can be improved. Meanwhile, the rotation preventive pin does not influence the flow rate resistance of the coolant when the nuclear reactor operates. Thus, the coolant flow rate is assured, and the cooling ability of the non fuel bearing components can maintain the same effect as that of the conventional case.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
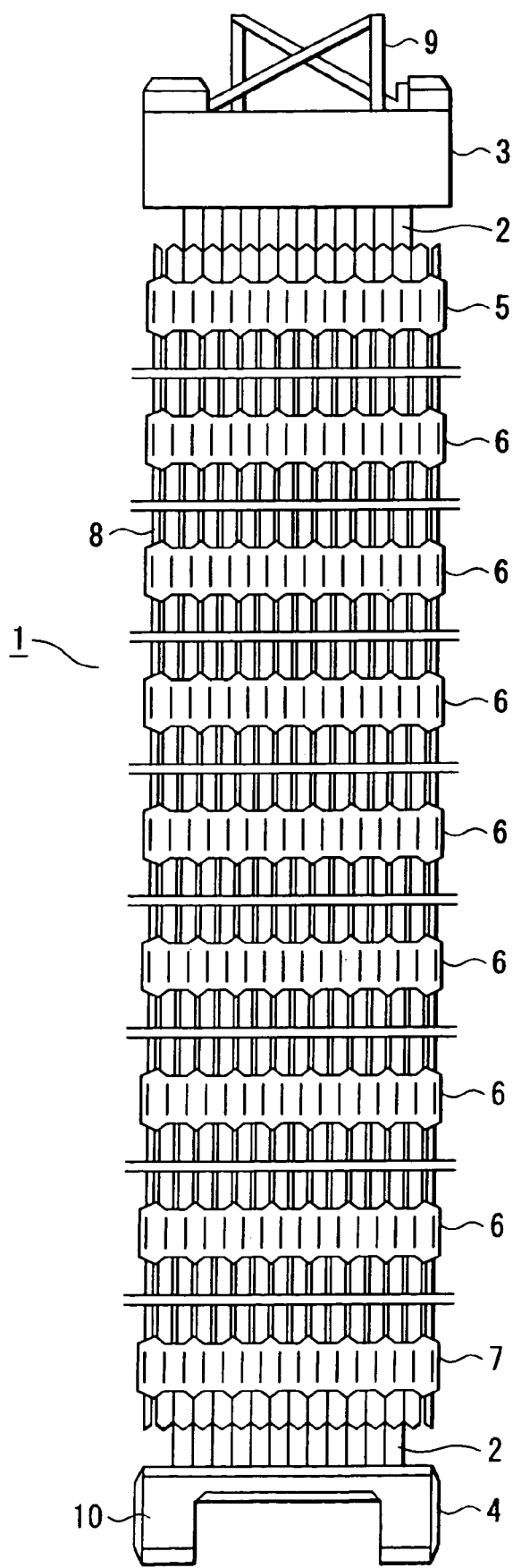
FIG. 1 is an elevation briefly showing the structure of a fuel assembly to be applied to a PWR.

The embodiments of the present invention will be described hereinafter with reference to the accompanying drawings.

Regarding the reference numerals used to describe the following embodiments, the same reference numerals denote the same portions as those of FIGS. 1 to 5.

First Embodiment

The first embodiment of the present invention will be described with reference to FIGS. 6 and 7.

Figure 2A:
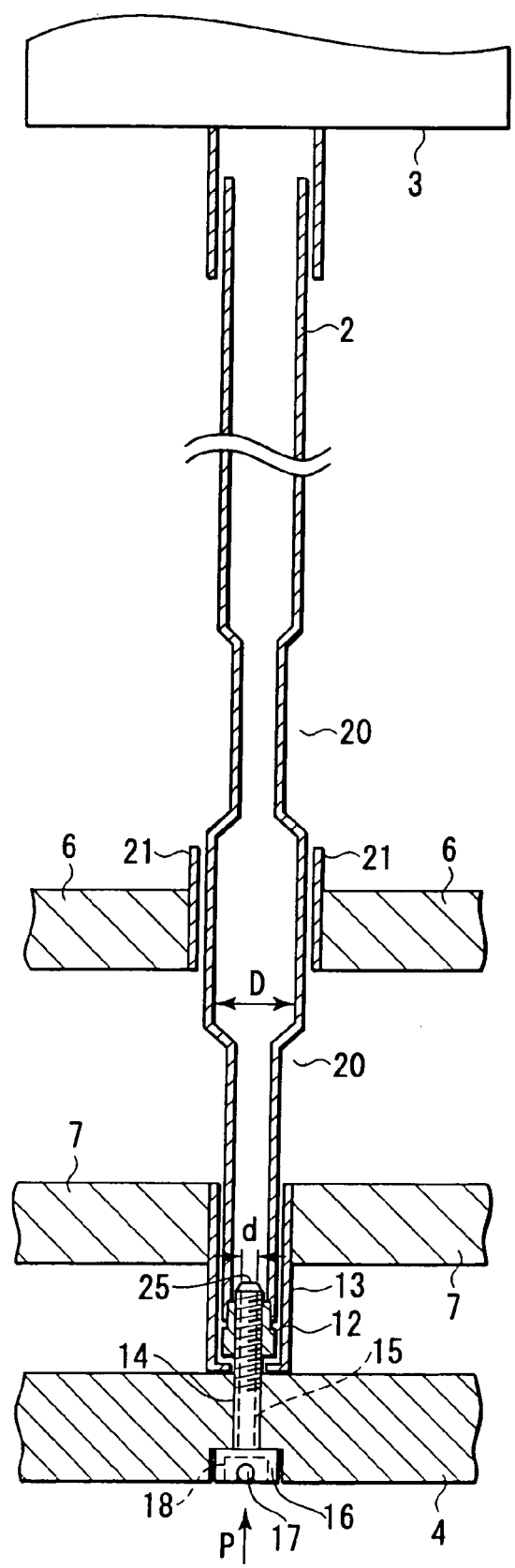
FIG. 2A is a sectional elevation showing part of the lower structure of the fuel assembly to be applied to the PWR.
Figure 2B:
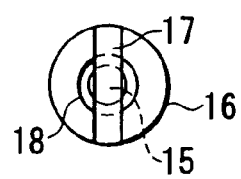
FIG. 2B is a bottom view of the fuel assembly to be applied to the PWR.
Figure 3:
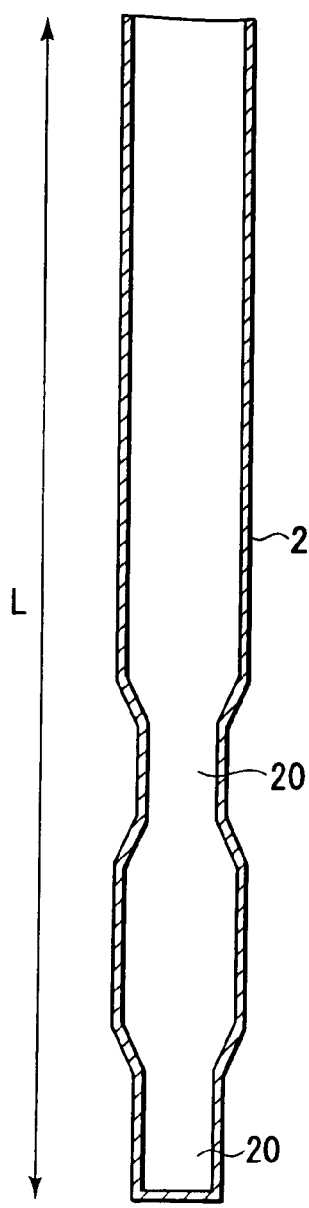
FIG. 3 is an elevation of a guide thimble with dashpots at two portions.
Figure 4:
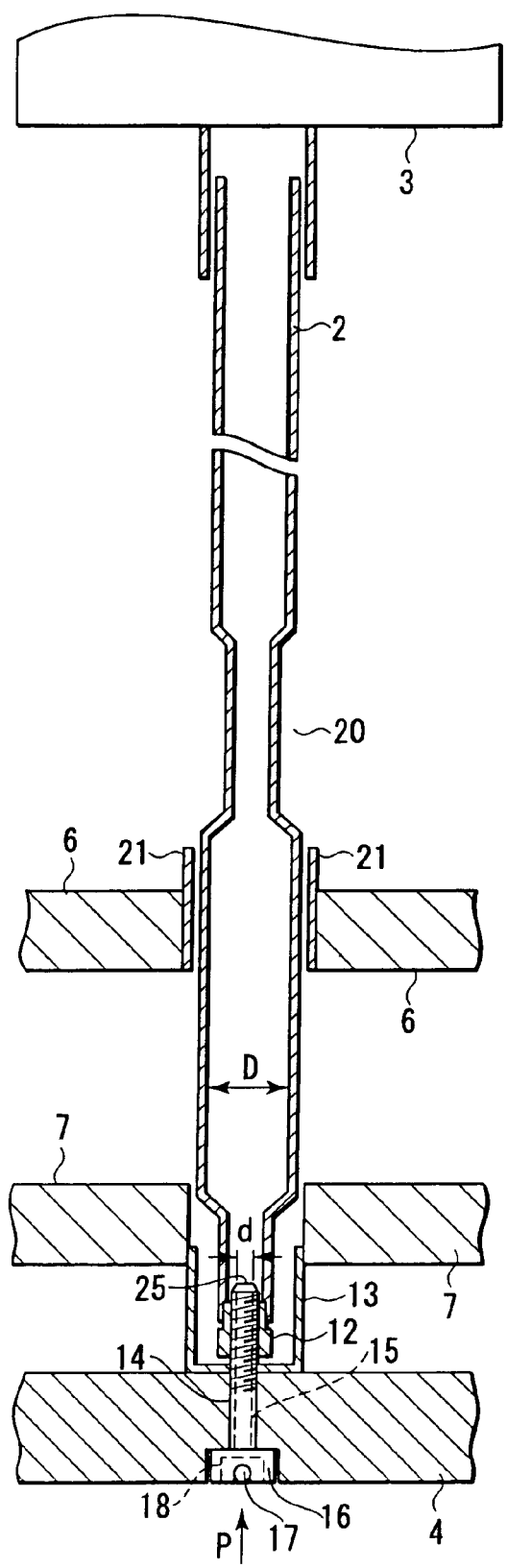
FIG. 4 is an elevation showing part of the lower structure of a fuel assembly to which an improved guide thimble is applied.
Figure 5:
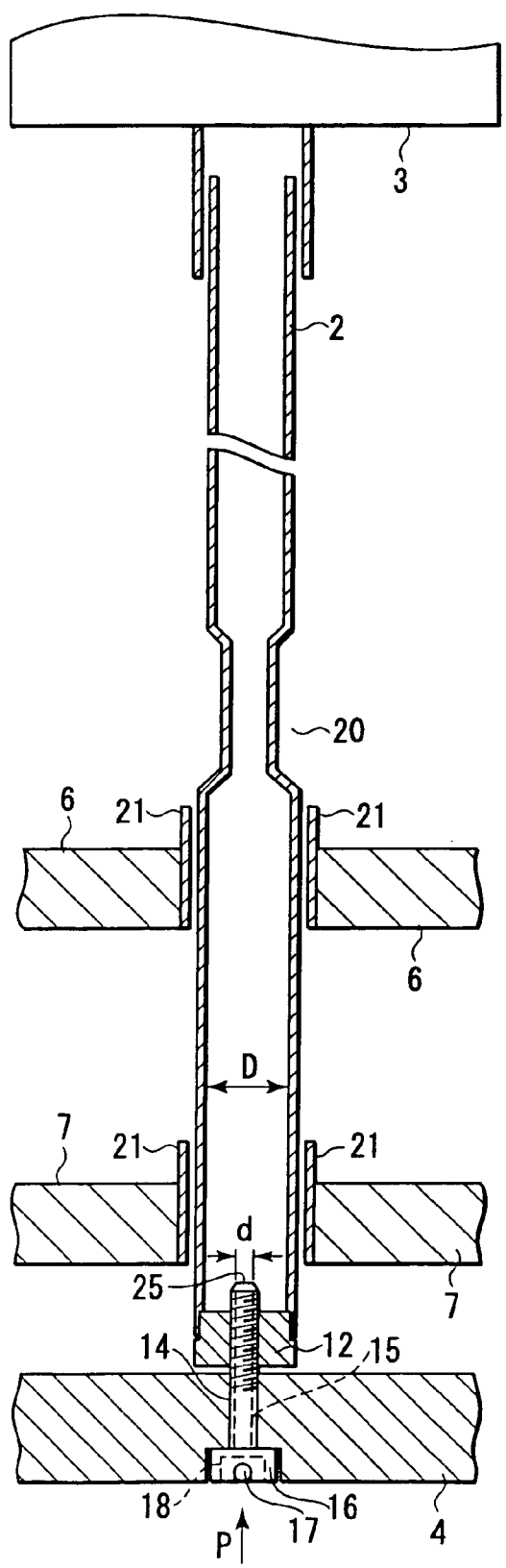
FIG. 5 is an elevation showing part of the lower structure of a fuel assembly to which an improved guide thimble is applied.

In a fuel assembly according the first embodiment of the present invention, the structure of a connecting portion for connecting its guide thimbles 2 and bottom nozzle 4 is as shown in FIGS. 2B and 4 or 5, and a so-called improved guide thimble is employed. An inner diameter D of the lower large-diameter portion of the guide thimble 2 and a diameter d of a drain hole 15 satisfy the following equation (1):

$$0.04\,D < d < 0.08\,D \quad (1)$$

The function of the fuel assembly according to this embodiment with the above arrangement will be described.

Figure 6:
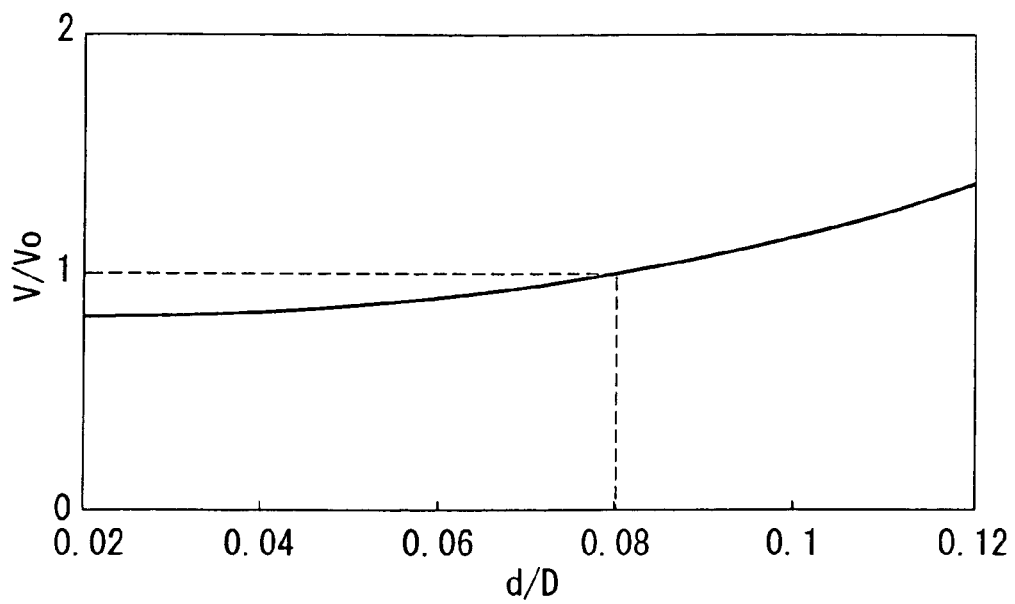
FIG. 6 is a graph showing the relationship between ((drain hole diameter d of thimble screw)/(inner diameter D of lower large-diameter portion of guide thimble)) and ((fall terminal velocity V of control rod)/(limited fall terminal velocity $V_0$ of control rod))

FIG. 6 is a graph showing results obtained by measuring a terminal velocity V of a control rod inserted in the guide thimble 2 by free fall in a fuel assembly 1 formed as shown in FIGS. 4 and 5, by using (d/D), which is the ratio of the diameter d of the drain hole 15 of a thimble screw 14 to the inner diameter D of the lower large-diameter portion of the guide thimble 2, as a parameter.

The axis of ordinate indicates $V/V_0$ obtained by dividing the terminal velocity V of the control rod inserted in the guide thimble 2 by free fall by a limited terminal velocity $V_0$ determined from the viewpoint of moderating the fall impact of the control rod. More specifically, the range of $(V/V_0)<1$ is a range where the terminal velocity V of the control rod inserted in the guide thimble 2 by free fall can be suppressed to be lower than the limited terminal velocity $V_0$. The range of $(V/V_0) \geq 1$ is a range where the terminal velocity V of the control rod inserted in the guide thimble 2 by free fall becomes equal to or more than the limited terminal velocity $V_0$.

As shown in FIG. 6, in the range of (d/D)<0.08, $(V/V_0)<1$ is established, and the terminal velocity V of the control rod inserted in the guide thimble 2 by free fall does not exceed the limited terminal velocity $V_0$ but satisfies the design standard. In the range of (d/D)$\geq$0.08, $(V/V_0)\geq 1$ is established, and the terminal velocity V of the control rod inserted in the guide thimble 2 by free fall exceeds the limited terminal velocity $V_0$ and does not satisfy the design standard.

Hence, from the viewpoint of the terminal velocity V of the control rod inserted in the guide thimble 2 by free fall, the diameter d of the drain hole 15 of the thimble screw 14 and the inner diameter D of the lower large-diameter portion of the guide thimble 2 must satisfy d<0.08 D.

As described earlier, the drain hole 15 of the thimble screw 14 serves to guide the coolant into the guide thimble 2 in order to cool the non fuel bearing components. From this viewpoint of assuring the cooling function, the larger the diameter d of the drain hole 15 of the thimble screw 14, the better.

Figure 7:
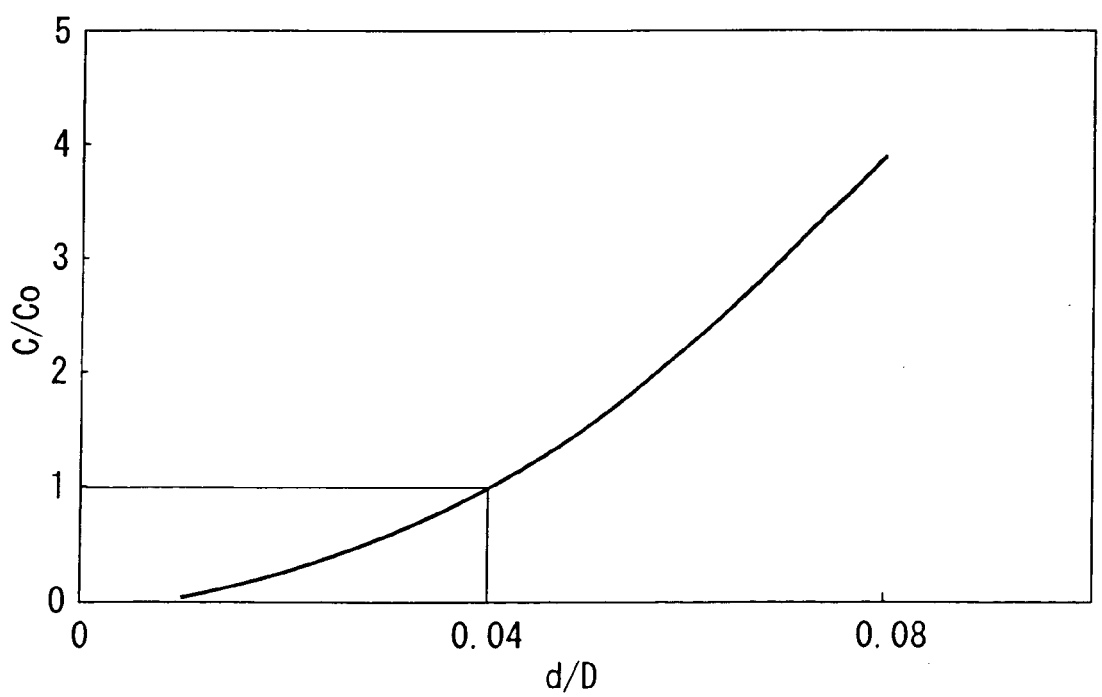
FIG. 7 is a graph showing the relationship between ((drain hole diameter d of thimble screw)/(inner diameter D of lower large-diameter portion of guide thimble)) and ((coolant inflow amount C from thimble screw)/(coolant inflow amount $C_0$ from thimble screw which is necessary for cooling non fuel bearing components))

FIG. 7 is a graph showing results obtained by measuring the cooling ability of the non fuel bearing components in a fuel assembly 1 formed as shown in FIGS. 4 and 5, by using (d/D), which is the ratio of the diameter d of the drain hole 15 of a thimble screw 14 to the inner diameter D of the lower large-diameter portion of the guide thimble 2, as a parameter.

The axis of ordinate indicates $C/C_0$ obtained by dividing a coolant inflow amount C from the thimble screw 14 by a coolant inflow amount $C_0$ necessary for cooling the non fuel bearing components when (d/D) is used as the parameter. More specifically, in the range of $(C/C_0) \leq 1$, the coolant inflow amount C does not exceed the necessary coolant inflow amount $C_0$. In the range of $(C/C_0) > 1$, the coolant inflow amount C exceeds the necessary coolant inflow amount $C_0$.

As shown in FIG. 7, in the range of (d/D)>0.04, $(C/C_0)>1$ is established, and the coolant inflow amount C becomes larger than the necessary coolant inflow amount $C_0$. In the range of $(d/D) \leq 0.04$, $(C/C_0) \leq 1$ is established, and the coolant inflow amount C does not exceed the necessary coolant inflow amount $C_0$.

Hence, from the viewpoint of the cooling ability, the diameter d of the drain hole 15 of the thimble screw 14 and the inner diameter D of the lower large-diameter portion of the guide thimble 2 must satisfy d>0.04 D.

In the fuel assembly according to this embodiment, an improved guide thimble is employed, and the inner diameter D of the lower large-diameter portion of the guide thimble 2 and the diameter d of the drain hole 15 of the thimble screw 14 are adjusted to satisfy 0.04 D<d<0.08 D.

Hence, the coolant can be sufficiently supplied also from the viewpoint of assuring the cooling function of the non fuel bearing components. From the viewpoint of moderating the fall impact of the control rod as well, the terminal velocity V of the control rod can be suppressed to be equal to or less than the fall velocity with which the fall impact of the control rod can be moderated. Therefore, flexural deformation of a dashpot 20 can be prevented.

Second Embodiment

The second embodiment of the present invention will be described with reference to FIG. 8 and FIGS. 9A to 9C.

Figure 8:
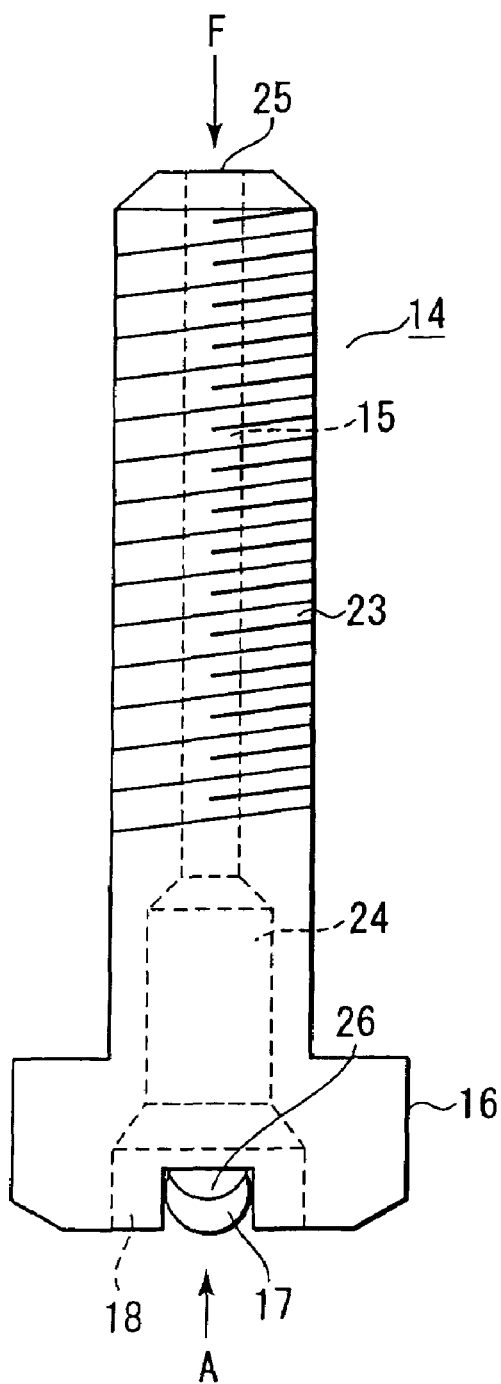
FIG. 8 is a view showing a state wherein a rotation preventive pin for a thimble screw in a fuel assembly according to the second embodiment of the present invention is built into the thimble screw.

FIG. 8 is a view showing a state wherein a rotation preventive pin 17 for a thimble screw 14 in a fuel assembly according to the present invention is built into the thimble screw 14.

Figure 9A:
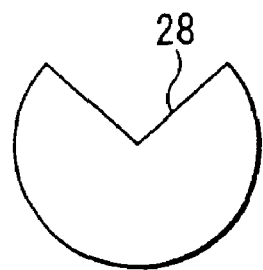
FIG. 9A is a view showing an example of the rotation preventive pin for the thimble screw in the fuel assembly according to the second embodiment of the present invention.
Figure 9B:
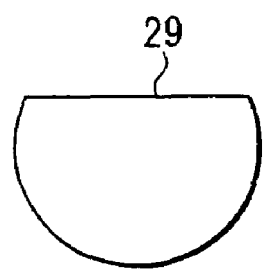
FIG. 9B is a view showing another example of the rotation preventive pin for the thimble screw in the fuel assembly according to the second embodiment of the present invention.
Figure 9C:
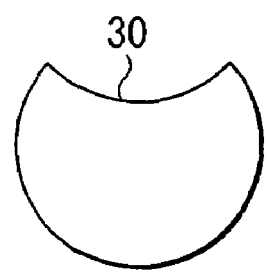
FIG. 9C is a view showing still another example of the rotation preventive pin for the thimble screw in the fuel assembly according to the second embodiment of the present invention.

FIGS. 9A, 9B, and 9C are views each showing a rotation preventive pin for a thimble screw in the fuel assembly according to this embodiment.

As shown in FIG. 8, a shaft 23 of the thimble screw 14 has a guide hole 24 as a hole extending from a spot facing hole 18 of a seat 16 to a drain hole 15 on the distal end side in the longitudinal direction of the thimble screw 14. With the rotation preventive pin 17 being mounted in the spot facing hole 18, during operation of the nuclear reactor, a coolant enters from the spot facing hole 18 of the seat 16 as shown in the direction indicated by an arrow A and is drained from a drain hole distal end 25. If the control rod is dropped in the scram mode, the coolant enters the drain hole 15 from the drain hole distal end 25 as shown in the direction of an arrow F and is drained from the spot facing hole 18 of the seat 16.

In the thimble screw 14 of the fuel assembly according to this embodiment, the rotation preventive pin 17 has, at its upper side namely the guide hole 24 side, a water receiving machined portion 26 formed of a recess with an arcuate section, so it receives the flow of the coolant passing through the guide hole 24 in the direction indicated by the arrow F in FIG. 8. The water receiving machined portion 26 increases the pressure drop of the coolant flowing in the direction of the arrow F.

FIGS. 8 and 9C show an arcuate machined portion 30 formed of a recess with an arcuate section as a typical example of the rotation preventive pin 17 with the water receiving machined portion 26. Alternatively, the water receiving machined portion 26 may be a V-shaped machined portion 28 with a V-shaped section, as shown in FIG. 9A, or a flat machined portion 29, as shown in FIG. 9B. The water receiving machined portion 26 can have any shape as far as it can increase the pressure drop in the direction of the arrow F against the flow of the coolant passing through the guide hole 24 in the direction of the arrow F, when compared to a conventional case wherein a rotation preventive pin without a water receiving machined portion 26 is used.

With the structure of the conventional rotation preventive pin, the ratio of the pressure drop coefficient for the flow of the coolant entering from the spot facing hole 18 of the seat 16 and draining from the drain hole distal end 25 as shown in the direction of the arrow A, to the pressure drop coefficient of the flow of the coolant entering from the drain hole distal end 25 and draining from the spot facing hole 18 of the seat 16 as shown in the direction of the arrow F, in the opposite manner, is almost 1:1.

The thimble screw 14 of the fuel assembly according to this embodiment has the rotation preventive pin 17 with the above arrangement. Thus, the ratio of the pressure drop coefficient of the flow of the coolant entering from the spot facing hole 18 of the seat 16 and draining from the drain hole distal end 25 as shown in the direction of the arrow A, to the pressure drop coefficient of the flow of the coolant entering from the drain hole distal end 25 and draining from the spot facing hole 18 of the seat 16 as shown in the direction of the arrow F, in the opposite manner, can be raised to the range of 1:2 to 1:3.

With the thimble screw 14 of the fuel assembly according to this embodiment, when the rotation preventive pin 17 with the shape as described above is used, the thimble screw 14 can also serve as a diode. Thus, while the non fuel bearing components have the same cooling ability as that of the conventional case, which is caused by the flow of the coolant in the direction of the arrow A, the decelerating effect of the control rod can be improved by the increase in fluid resistance against the flow in the direction of the arrow F.

Third Embodiment

The third embodiment of the present invention will be described with reference to FIGS. 10 and 11.

Figure 10:
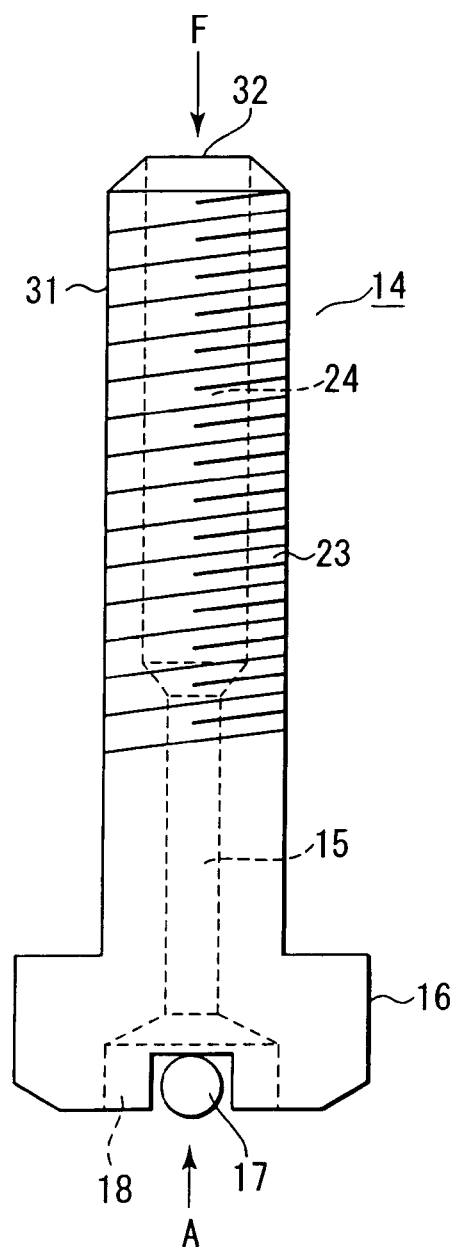
FIG. 10 is a view showing an example of a thimble screw in a fuel assembly according to the third embodiment of the present invention.
Figure 11:
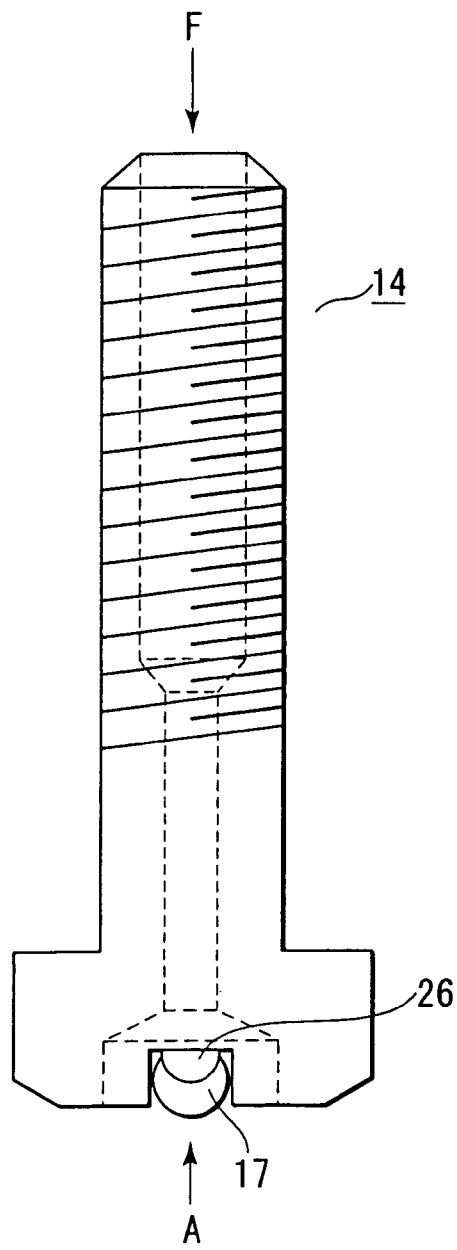
FIG. 11 is a view showing another example of a thimble screw in a fuel assembly according to the third embodiment of the present invention.

FIGS. 10 and 11 are views each showing a thimble screw in a fuel assembly according to this embodiment.

In a thimble screw 14 for the fuel assembly according to this embodiment, a guide hole 24 is formed in the thimble screw 14 on a distal end side 31, and a drain hole 15 is arranged in the thimble screw 14 on a seat 16 side.

Referring to FIG. 10, a shaft 23 of the thimble screw 14 has the drain hole 15 extending between the guide hole 24 and a spot facing hole 18 of the seat 16. The opening area of the drain hole 15 is set smaller than the opening area of the guide hole 24 or the opening area of the spot facing hole 18. With a rotation preventive pin 17 being mounted in the spot facing hole 18, during operation of the nuclear reactor, a coolant enters from the spot facing hole 18 of the seat 16 in the direction of an arrow A in FIG. 10 and is drained from a guide hole distal end 32.

When a control rod is dropped in the scram mode, the coolant flows in the direction of an arrow F and enters from the guide hole distal end 32 to flow through the spot facing hole 18 of the seat 16. After passing through the drain hole 15, the coolant forms a jet as the flow path area is abruptly increased by the spot facing hole 18 of the seat 16, and jets out toward the rotation preventive pin 17.

With this arrangement, when the control rod is dropped in the scram mode and the coolant enters from the distal end side 31 in the direction of the arrow F, the rotation preventive pin 17 functions strongly as the fluid resistance against the jet. Thus, the pressure drop against the flow of the coolant in the direction of the arrow F can be increased, and the decelerating effect of the control rod can be improved.

In the thimble screw 14 of the fuel assembly shown in FIG. 11, the rotation preventive pin 17 with the water receiving machined portion 26 in the thimble screw 14 shown in FIG. 8 and FIG. 9A, 9B, or 9C is combined with the thimble screw 14 with the arrangement shown in FIG. 10. This rotation preventive pin 17 has a water receiving machined portion 26, in the same manner as the rotation preventive pin 17 of the second embodiment.

Since the thimble screw of the fuel assembly according to this embodiment has the above arrangement, the coolant enters from the guide hole distal end 32 in the direction of the arrow F shown in FIG. 10 and is discharged in the form of a jet from the drain hole 15 toward the rotation preventive pin 17. As the rotation preventive pin 17 strongly functions as a fluid resistance against the jet, the pressure drop for the flow of the coolant in the direction of the arrow F can be increased, and the decelerating effect of the control rod can be improved. Meanwhile, the rotation preventive pin 17 does not influence the flow rate resistance of the coolant in the direction of the arrow A. Thus, the coolant flow rate is assured, and the cooling ability of the non fuel bearing components can maintain the same effect as that of the conventional case.

When the rotation preventive pin 17 with the water receiving machined portion 26 is combined with a thimble screw in which the opening area of the drain hole 15 is set smaller than the opening area of the guide hole 24 or the opening area of the spot facing hole 18, as in the thimble screw 14 of the fuel assembly shown in FIG. 11, the difference in pressure drop of the flow in the direction of the arrow A or F further increases. Therefore, a thimble screw for a fuel assembly with a better diode performance can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel assembly comprising:
   a bottom nozzle configured to be disposed on a lower plate of a nuclear reactor;
   a top nozzle including a hold down spring configured to urge the bottom nozzle toward the lower plate;
   a plurality of control rod guide tubes configured to guide control rods, passed through the top nozzle toward the lower plate; and
   a thimble screw locked to the bottom nozzle at a seat with a rotation preventive pin to connect the control rod guide tubes to the bottom nozzle, the thimble screw comprising
   a drain hole extending in a longitudinal direction from a spot facing hole of the seat to a distal end and configured to receive coolant supplied into the drain hole from the spot facing hole toward the distal end while the nuclear reactor operates and to receive coolant supplied into the drain hole from the distal end toward the spot facing hole during a scram mode, and a coolant collision portion at a drain hole side of the rotation preventing pin against which the coolant flowing from the distal end toward the spot facing hole collides in order to increase pressure drop of the coolant during the scram mode, wherein a collision surface of the coolant collision portion against which the coolant collides forms a flat surface.

2. A fuel assembly, comprising:
   a bottom nozzle configured to be disposed on a lower plate of a nuclear reactor;
   a top nozzle including a hold down spring configured to urge the bottom nozzle toward the lower plate;
   a plurality of control rod guide tubes configured to guide control rods, passed through the top nozzle toward the lower plate; and
   a thimble screw locked to the bottom nozzle at a seat with a rotation preventive pin to connect the control rod guide tubes to the bottom nozzle, the thimble screw comprising
   a drain hole extending in a longitudinal direction from a spot facing hole of the seat to a distal end and configured to receive coolant supplied into the drain hole from the spot facing hole toward the distal end while the nuclear reactor operates and to receive coolant supplied into the drain hole from the distal end toward the spot facing hole during a scram mode, the drain hole having a first large inner diameter portion at a distal end side, a second large inner diameter portion at a seat side, and a small inner diameter portion between the first and the second large inner diameter portions, the spot facing hole is disposed on the seat side, thereby flow rate resistance of the coolant is not influenced while the nuclear reactor operates, and pressure drop for the flow rate of the coolant is increased and decelerating effect of the control rods is improved during the scram mode.

3. A fuel assembly according to claim 2, wherein the thimble screw comprises a coolant collision portion provided at the seat, against which the coolant flowing from the distal end toward the spot facing hole collides to increase pressure drop of the coolant during the scram mode, wherein a collision surface of the coolant collision portion against which the coolant collides forms a flat surface.

4. A fuel assembly, comprising:
   a bottom nozzle configured to be disposed on a lower plate of a nuclear reactor;
   a top nozzle including a hold down spring configured to urge the bottom nozzle toward the lower plate;
   a plurality of control rod guide tubes configured to guide control rods, passed through the top nozzle toward the lower plate; and a thimble screw locked to the bottom nozzle at a seat with a rotation preventive pin to connect the control rod guide tubes to the bottom nozzle, the thimble screw comprising
a drain hole extending in a longitudinal direction from a spot facing hole of the seat to a distal end and configured to receive coolant supplied into the drain hole from the spot facing hole toward the distal end while the nuclear reactor operates and to receive coolant supplied into the drain hole from the distal end toward the spot facing hole during a scram mode, the drain hole having a large inner diameter portion at a distal end side and a small inner diameter portion at a seat side, the spot facing hole disposed on the seat side,
wherein the thimble screw comprises a coolant collision portion provided at the seat, against which the coolant flowing from the distal end toward the spot facing hole collides to increase pressure drop of the coolant during the scram mode,
wherein a collision surface of the coolant collision portion against which the coolant collides forms a flat surface.

* * * * *